United States Patent Office 3,544,996
Patented Dec. 1, 1970

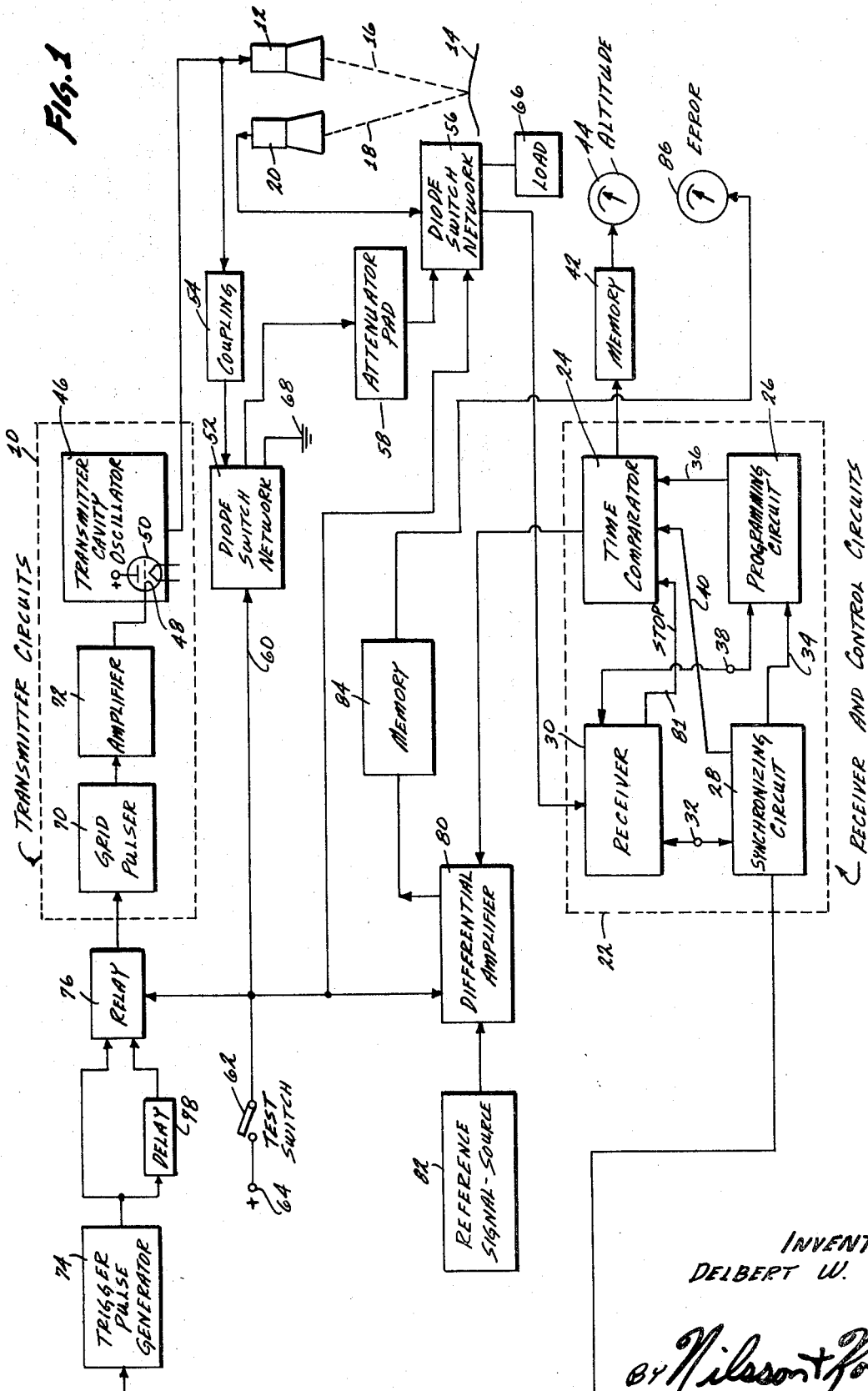

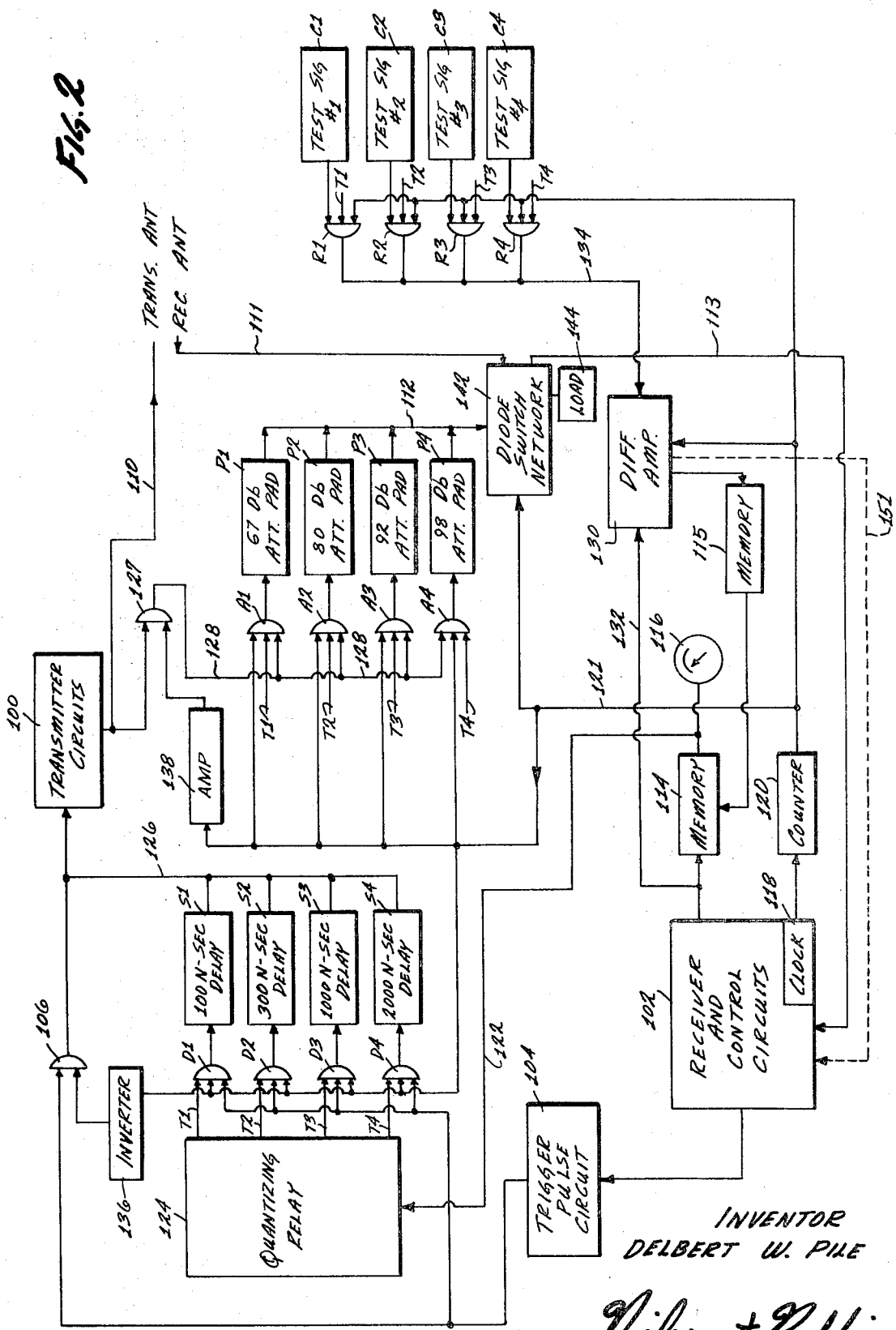

3,544,996
RADAR SYSTEM INCORPORATING
CALIBRATION MEANS
Delbert W. Pile, Northridge, Calif., assignor to The
Bendix Corporation, a corporation of Delaware
Filed Feb. 10, 1969, Ser. No. 799,152
Int. Cl. G01s 7/40
U.S. Cl. 343—17.7                            11 Claims

ABSTRACT OF THE DISCLOSURE

A radar distance-measuring system is disclosed wherein pulses of travelling-wave energy are transmitted over a distance that is to be measured, and echoes are then sensed to determine a time interval which is directly related as a measurement of the distance. The system includes self-testing structure (whereby the pulses are delayed with reference to the operating program of the system) and attenuating means for coupling such pulses to the receiver as simulated echoes. Signals (indicative of distance) that are developed from a simulated echo are compared with a reference signal to develop an error-indicating signal. Structure is disclosed for calibrating or correcting the operation of the radar system in accordance with the error-indicating system. Additionally, the disclosed system incorporates means for variously delaying and attenuating the synthesized echo signal, which are selectively actuated in accordance with the indicated distance. Sequence control structure is also disclosed for the self-test system.

BACKGROUND AND SUMMARY OF THE INVENTION

Radar and radar-distance measuring systems have come into rather widespread use as altimeters, to provide accurate information on the terrain below an aircraft in flight. Improved forms of such radar altimeters are capable of accurately indicating altitude as it varies from several hundred feet down to nearly zero. Such forms of altimeters normally incorporate rather-complex electrical components, the stability of which relate directly to the accuracy of the instrument. Specifically, for example, such components as a ramp generator (for relating time to distance) a cavity oscillator, program-sequencing circuits and so on, all must operate reliably to preserve the accuracy of the instrument. In general, with aging the characteristics of such components tend to change so that it is desirable to periodically test or re-calibrate the instrument. In accordance with one aspect hereof, the system incorporates self-testing structure for indicating the present error or deviation in the operation of the system.

In the operation of conventional radar altimeters, the characteristics of the system usually vary to some degree, depending on altitude. For example, the conversion ramp (relating time to distance) is exceedingly difficult to maintain completely linear over an entire operating range of altitude. However, in the past it has been conventional practice to strive for such linearity, which has generally resulted in systems of increased complexity and cost. As another aspect of the present invention, the system hereof provides one solution to this problem incorporating means for automatically calibrating (testing and adjusting) the system so as to compensate for variations in component operation as well as characteristic changes with altitude. In one operating embodiment, the system incorporates self-calibrating structure which is selectively operative depending upon the currently-indicated altitude.

Summarizing, the system of the present invention incorporates self-testing structure which either may be selectively operated manually or may be programmed for automatic operation at intermittent intervals. The degree of error may be manifest for visual observation by an operator, or may be employed to alter altitude indications so as to correct or re-calibrate the system. As a further feature, the self-testing structure may vary in accordance with the indicated altitude, so as to calibrate the system for optimum operation at the current altitude. The utilization of such structures enables considerable compromise in other components of the system or substantial improvement in the standards which may be attained.

BRIEF DESCRIPTION OF THE DRAWINGS

In the drawings, which constitute a part of this specification, exemplary embodiments demonstrating various objectives and features hereof are set forth specifically:

FIG. 1 is a block diagram of an altimeter constructed in accordance with the present invention; and FIG. 2 is a block diagram of an alternate form of the altimeter as depicted in FIG. 1.

DESCRIPTION OF THE ILLUSTRATIVE EMBODIMENT

Considering the system hereof, initially somewhat in general, a block unit designated as transmitter circuits 10 (top of FIG. 1) provides pulses of RF energy to a transmitting antenna 12 (extreme right). As a result, a wave of travelling energy passes to an object, e.g., ground 14, as indicated by a dashed line 16. Of course, energy reflections from the ground 14 emanate in many directions; however, the echo of concern indicated by a dashed line 18 and is sensed by a receiving antenna 20 for application (as an electrical signal) to receiver and control circuits 22 (bottom central).

Generally, as well known in pulse-echo radar systems, the operation of the present system involves measuring the time interval between the instant when a pulse is transmitted by the antenna 12 and the instant when an echo is received by the antenna 20. As the propagation speed of the pulse and the echo are known (and are constant) the measured interval may be directly related to the travelled distance.

In the system of FIG. 1, the "distance" time interval is determined by a time comparator 24 which is included in the block designated "receiver and control circuits 22," along with a programming circuit 26, a synchronizing circuit 28 and a receiver 30. The operation of the system is synchronized and programmed by the circuits 28 and 26. Specifically, the synchronizing circuit 28 establishes the basic pulse-rate frequency of the system and additionally provides timing signals for the tracking operation. The circuit 28 is connected to the receiver 30 through a cable 32 and is also connected to the programming circuit 26 through a conductor 34.

The programming circuit 26 initiates the operation of a distance-measuring interval by providing a signal to the time comparator 24 through a conductor 36. The programming circuit 26 also functions to time the operation of the system and in this regard is connected through a cable 38 to the receiver 30.

Subsequent to each operating cycle of the system, the time comparator 24 is reset by a reset signal that is supplied through a conductor 40 from the synchronizing circuit 28. In this manner, the system operates repeatedly to produce indications of altitude which are received in a memory 42 which in turn drives a meter 44 as well known in the prior art.

The novelty of the system hereof is deemed to reside primarily in the self-checking structure in combination with certain well known elements. In this regard, several such components of this system are disclosed in detail and their operation is fully explained in U.S. Pat. 3,309,703 issued Mar. 14, 1967 to Ammon et al. Thus, the detailed disclosure of the Ammon et al. patent includes structural apparatus readily usable for certain elements herein, including the receiver 30, the time comparator 24, the synchronizing circuit 28 and the programming circuit 26.

Turning now to the structure of the transmitter circuits 10, a cavity oscillator 46 is employed as a source of RF energy, for example having a frequency of 4,300 megacycles. The cavity oscillator may be repetitively pulsed at the RF frequency, as well known in the prior art and keyed into effective oscillation by the control grid 48 of a triode 50 comprising a part of the cavity oscillator. The output of the cavity oscillator 46 is applied directly to the transmitting antenna 12.

The output from the oscillator 46 may also be applied directly to the receiver 30 through a coupling 54, a diode switch network 52, an attenuator pad 58 and a diode switch network 56 forms of which are well known in the prior art. Thus, functionally, the diode switch networks 52 and 56 couple the output from the oscillator 46 to the receiver 30 while at the same time eliminating the possibility of any RF signal from receiving antenna 20 from reaching receiver 30 by directing it in diode switch network 56 into a load 66 where it would be dissipated.

Coupling to the receiver 30 depends upon the presence of a high-state signal in the conductor 60. Various structures satisfactory for use as switch networks 52 and 56 are well known in the prior art, as for example widely-used diode "and" and "inhibit" gate circuits. In the condition when there is no high-state qualifying signal in the conductor 60 so that the diode switch network 52 is not activated, essentially none of the RF signal from coupling 54 passes through diode switch network 52 to attenuator pad 58, but rather is dissipated to ground 68.

The binary signal in the conductor 60 indicates the position of a manual test switch 62 which is connected to a source of potential that is applied at a terminal 64. Recapitulating, closing the test switch 62 results in the application of potential to the diode switch networks 52 and 56 enabling the output from the oscillator 46 to be supplied; through the diode networks 52 and 56 and the attenuator pad 58 to the receiver 30. Alternatively, when the test switch 62 is open, the output from the oscillator 46 is supplied through coupling 54 to the diode switch network 52 and dissipated in ground 68. The RF signal in antenna 20 is routed through diode switch network 56 and depending on the position of the switch 62, either applied to receiver 30 or dissipated in load 66. That is, when test switch 62 is open (i.e. the normal or non-test mode) any RF signal in the antenna would be routed to the receiver 30 rather than being dissipated in the load 66, and the antenna 20 is only connected through switch 56 to the load 66 when test switch 62 is closed. Thus, the diode switch network may include an "inhibit" gate and an "and" gate as well known in the prior art.

The RF energy pulse that is to be transmitted originates under the control of a grid pulser 70 (as disclosed in the above-identified Ammon patent) the output of which is connected to the grid 48 through an amplifier 72. The grid pulser 70 receives a start pulse from a trigger pulse generator 74 which is driven by the synchronizing circuit 28. In general, the trigger pulse generator 74 provides a short duration pulse through a relay 76 which commands the grid pulser 70 to initiate a control pulse for passage through the amplifier 72 to the grid 48 of the triode 50. In driving the oscillator 46 in this manner, the pulser 70 may be time modulated as well known in the prior art.

The single-pole, double-throw relay 76 is controlled by the test switch 62, normally passing pulses from the trigger pulse generator 74 directly to the grid pulser 70. However, when the test switch 62 is closed, the relay 76 receives pulses which pass through a delay circuit 78, imposing a delay with regard to the synchronizing circuit 28.

In the operation of the system, the synchronizing circuit 28 repeatedly actuates the trigger pulse generator 74 to initiate a cycle of operation. Of course, as well known in the prior art, the repetition rate of the system may be variable in accordance with the observed altitude of other considerations. However, the repetition rate may, for example, vary about a mean rate including a period of some 500 microseconds per operation.

During each cyclic interval of actual measurement, the synchronizing circuit 28 actuates the trigger pulse generator 74 to drive the grid pulser 70 which actuates the cavity oscillator 46 through the amplifier 72. Thereupon, during a regular measuring cycle, a pulse of energy is supplied from the oscillator 46 through the network 52 and the coupling 54 to energize the antenna 12 for transmission of a pulse of travelling wave energy.

The echo from the transmitted pulse is received by the antenna 20 and supplied (as an echo signal) to the receiver 30. The interval between the transmission of a pulse and the receipt of the echo is sensed by the time comparator 24 which may incorporate a ramp circuit as well known in the prior art. For example, the time comparator 24 may initiate a ramp voltage on command from the programming circuit 26. Subsequently, when the echo is received at the receiver 30, a signal is supplied through a conductor 81 indicating a point on the voltage ramp which is indicative of time (and also of distance). That is, the signal level attained by the ramp is indicative of the expired time and consequently of the instant altitude. Accordingly, a sample of the ramp, taken precisely on receipt of the echo, is supplied to the memory circuit 42 from which it controls the meter 44. The memory circuit 42 may comprise any of a variety of storage structures as for example those including a capacitive integrator circuit.

As indicated above, detailed structure satisfactory for use in the receiver and control circuits 22 are shown and described in the above referenced Pat. 3,309,703. The operation of sensing and processing an echo for the development of a range signal indicative of distance is also described in considerable detail in that patent. However, in accordance herewith, synthesized echo signals also are developed and processed to provide an indication of the operating error currently present in the system.

The system is shifted to a self-testing state wherein synthesized echo signals are provided by closure of the test switch 62. Thereupon, the diode switch network 52 couples pulses from the oscillator 46 through the coupling 54 to the attenuator pad 58 and through diode switch network 56 to the receiver 30. These coupled pulses of travelling wave energy are converted to synthesized echoes for test purposes.

In general, the operation of the system during the self-test mode is to delay the output from the trigger pulse generator 74, thereby effectively delaying the pulse from the oscillator 46 with reference to the operative state of the time comparator 24. Consequently, the developed energy pulse is delayed by a predetermined interval coinciding to a predetermined distance. The delayed pulse is further processed as a simulated echo by passage through the attenuator pad 58 enroute to the receiver 30. This delayed and attenuated pulse provides a qualitative test of transmitter cavity oscillator 46 power and performance as well as the sensitivity of the receiver 30.

In response to such a simulated or synthesized echo, the receiver and control circuits develop a range signal as described above, which is indicative of an altitude. That range signal is applied from the time comparator 24 to a differential amplifier 80 that is qualified to operate only during the "test" state by a signal from the switch 62. The differential amplifier 80 also receives a signal from a reference-signal source 82 that is truly indicative of the predetermined "test" distance. Consequently, the differential amplifier 80 provides a potential that is indicative of the difference between the two applied signals which are both indicative of range, i.e. the developed test signal and the reference signal. The differential signal is applied to a memory circuit 84 the output of which is in turn applied to a meter 86 that manifests the error observed to exist. In that manner, the current accuracy of the system is clearly indicated.

In addition to delaying the synthesized echo signal, as indicated above, it is also important in many applications to reduce it to an appropriate amplitude. This operation, for example, is applicable in systems wherein the pulse rate is variable with the observed altitude or range as disclosed in the above referenced Ammon patent. In that system, the synchronizing circuit 28 provides pulses to the trigger pulse generator 74 at a variable rate, depending upon the observed altitude. Accordingly, the system hereof provides the attenuator pad 58 to accomplish the desired amplitude adjustment. Thus, a synthesized echo signal from the attenuator pad 58 is not only time delayed by a predetermined amount (coinciding to distance) but additionally is attenuated by a predetermined amount so as to accurately depict the echo signal which would have resulted from an actual transmission at an altitude or range related to the predetermined delay interval.

Reviewing and summarizing the total operation, with the test switch 62 open, the system functions in its normal mode as an altimeter. In that mode of operation, the synchronizing circuit 28 provides periodic pulses to the trigger pulse generator 74, which pulses the grid pulser 70 through the relay 76. On receipt of an input pulse, the grid pulser 70 drives the cavity oscillator 46 through the amplifier 72. During this mode of operation, the output from the oscillator 46 is passed to the transmitting antenna 12. Consequently, a burst or pulse of travelling wave energy is emitted and in due course the echo therefrom is sensed by the receiving antenna 20 for application to the receiver 30.

At the instant when the pulse is transmitted from the antenna 12, the programming circuit 26 commands the time comparator 24 to initiate a linear timing ramp. The signal-level that is attained by that ramp at the instant when the echo signal reaches the receiver 30 is indicative of the observed altitude. Consequently, a sample of the signal level attained by the ramp is provided to a memory 42 which drives the altitude meter 44. As indicated, the repetition rate for such cycles of operation may be variable dependent upon the observed range, as disclosed in detail in the above-identified patent.

During self-test operation, the switch 62 is closed providing a control signal to the self-test components including the relay 76, the diode switch networks 52 and 56 and the differential amplifier 80. With the system in a "test" configuration, the output from the pulse generator 74 is delayed by an interval coinciding to a predetermined distance in the time-distance relationship of the comparator 24. Such a delayed signal is supplied through the relay 76 to the grid pulser 70 which acts through the amplifier 72 to drive the oscillator 46. The pulse from the oscillator 46, during this mode of operation is coupled through coupling 54 and is supplied through the switch network 52 to the attenuator pad 58 which attenuates the applied pulse somewhat proportionately to an echo signal observed at the predetermined altitude. Consequently, the output from the attenuator pad 58 is a simulated echo signal, ideally indicative of a predetermined distance by reason of its time of occurrence and its amplitude and is coupled through diode switch network 56 to receiver 30.

The synthesized echo signal is applied to the receiver 30 to stop the time comparator 24, causing the latter to produce a range signal representative of the predetermined distance. As that signal is developed by the identical circuits employed for an actual distance measurement, it reflects any errors currently being introduced by the circuits. The ideal or correct amplitude for that signal manifests the predetermined distance, and a reference signal of such amplitude is provided from the reference signal source 82 to the differential amplifier 80. Consequently, any difference (positive or negative) between the reference signal from the source 82 and the processed signal from the time comparator 24 represents an error in the instant operation of the system. That error signal is supplied to a memory 84 which drives the meter 86 to indicate the level of the current operating error.

In an alternative arrangement, the meter 86 may be replaced by a threshold device which is actuated only if the error exceeds predetermined level. With such an arrangement, an operator may close the test switch 62 and unless an excessive error signal is indicated, he may rely upon the accuracy of the altimeter. Of course, if the meter 86 is employed, the operator is provided an indication of the extent of error and may take such an error into account in observing the altitude indicated by the meter 44 or may pursue corrective measures in the system to reduce the error.

In certain applications, it is desirable to incorporate automatic self-checking into the system. Furthermore, in accordance herewith, the system may also function to perform calibration adjustments corrective of an observed error. A system incorporating such features is shown in FIG. 2 and will now be considered in detail.

As the system is shown in FIG. 2, the transmitter circuits are represented by a single block 100 while the receiver and the control circuits are similarly represented by a single block 102. The details of these units may be as described with reference to FIG. 1. Essentially the basic altimeter operation of the system of FIG. 2 is similar to that described above with reference to FIG. 1. Specifically, the receiver and control circuits 102 (lower left) provide a start signal to a pulse circuit 104 which is coupled through an "and" gate 106 to the transmitter circuits 100. Upon receiving such a pulse, the transmitter circuits 100 pass a burst or pulse of energy through conductor 110 to a transmitting antenna (not shown) as disclosed in FIG. 1.

The reflected echo of the transmitted pulse is received by a receiver antenna (not shown) which is coupled to a conductor 111 which is also connected to a diode switch network 142, network 142 in turn being coupled to the receiver and control circuits 102 as described below via conductor 113. Thus, in the basic operation of the system, the receiver and control circuits 102 sense the interval between the instant when a pulse is initiated and the instant when an echo is received. As explained, such a time interval is indicative of distance, e.g., altitude, and is retained by a memory 114 to drive a meter 116.

Cyclic operations, as described above, are sequenced by a clock 118 which is contained within the synchronizing circuit of the receiver and control circuits 102. The detailed structure of such a clock is described in the above referenced Ammon patent. Pulses from the clock 118 are tallied by a counter 120 to periodically command a self-test operating cycle re-calibrating the system when the counter 120 overflows. As indicated above, the calibration of the altimeter is always performed on the basis of the currently-indicated altitude of the altimeter. In this regard, the range signal (from the memory 114) is connected through a conductor 122 to a quantizing relay 124 which provides one of four outputs exclusively high depending upon the amplitude of the applied signal. Specifically, the quantizing relay 124 has four binary outputs T1, T2, T3 and T4, each of which represents one range of amplitude for the range signal 122. For example, if the indicated range lies between zero and 100 feet, the signal T1 will be high while the signals T2, T3 and T4 will be low. If the indicated range is between 100 feet and 300 feet the signal T2 will be high while all others will be low, and so on with signals T3 and T4 defining ranges of 300 to 750, and above 750 respectively.

The quantizing relay 124 may take a wide variety of structural forms including electronic switching circuits, some of which may incorporate a cathode ray beam switch. In such an arrangement, the cathode ray beam is deflected proportionately to the amplitude of the range signal applied through the conductor 122. The beam may dwell upon any of four targets, depending upon the degree of deflection. In this manner, depending upon the target upon which the beam dwells, one of the binary signals T1, T2, T3 or T4 is provided high.

The signals T1, T2, T3 and T4 are connected respectively to delay "and" gates D1, D2, D3 and D4 which may comprise various forms of the well known "and" gate and which functionally provide an output pulse during an interval when all inputs thereto are in a high state. The outputs from the gates D1, D2, D3 and D4 are connected respectively to delay circuits S1, S2, S3 and S4, each of which incurs a different predetermined period of delay in a received signal. Specifically, for example in a system operating on the basis of available reference calibrations at 50 feet, 150 feet, 500 feet and 1,000 feet, the delay circuits S1, S2, S3 and S4 would accomplish respective delays of 100 nanoseconds, 300 nanoseconds, 1,000 nanoseconds and 2,000 nanoseconds.

The output signals from the delay circuits S1, S2, S3 and S4 are connected through a common conductor 126 to the transmitter circuits 100. However, in the operation of the system, signals from the delay circuits S do not result in the transmission of a pulse of travelling wave energy, but rather they command a synthesized echo signal which is developed when the system is operating in the self-test mode.

As indicated above, the system enters the self-test mode when the counter 120 overflows to produce a high signal. The self-test mode then endures for only a single cycle of the receiver and control circuits 102.

The output signal from the counter 120 is connected to qualify all the series of "and" gates A1, A2, A3 and A4 as well as the similar gates D1, D2, D3 and D4. The outputs from the gates A1, A2, A3 and A4 are connected respectively to attenuator pads P1, P2, P3 and P4.

The gates A1, A2, A3 and A4 also receive the output from the transmitter circuits 100 through an "and" gate 127 (qualified by the output of the counter 120 through an amplifier 138) and a conductor 128 and are additionally individually qualified by the range-indicating control signals T1, T2, T3 and T4. For example, if during a self-calibration operation gate the observed range were 50 feet, the signal T1 would be high thereby qualifying the gate A1 (along with the output from the counter 120) permitting the pulse from the transmitter circuits 100 to pass through the attenuator pad P1 to the conductor 112.

The attenuator pads P1, P2, P3 and P4 accomplish varying amounts of attenuation. Specifically, if as indicated above, amplitude calibrations are to be made on a representative basis for altitudes of 50 feet, 150 feet, 500 feet and 1,000 feet, the pads P1, P2, P3 and P4 would have values respectively of 67 db, 80 db, 92 db and 98 db. The outputs from each of the attenuator pads P1, P2, P3 and P4 are connected through the conductor 112 and diode switch network 142 to the receiver and control circuits 102. During test intervals, the receiving antenna is coupled to a dummy load 144 by the network 142 as explained above.

Recapitulating, it may be seen from the above description that during periodic intervals (when the counter 120 reaches a full count then overflows) a self-calibrating operation is commanded. At that time, a synthesized echo signal is developed; however, the synthesized echo signal is dependent upon the instant observed range (indicated by the range signal in the conductor 122) a particular delay is incurred and a particular attenuation is applied. In that manner, the synthesized echo signal is related to the current operation of the system and in that regard serves to calibrate the system at its current operating range. The receiver and control circuits 102 develop a representative range indication based upon the synthesized echo signal. The comparison of such a range signal with a standard produces an error signal which then is employed to calibrate the system for operation at a select range.

During the single cycle of self-calibration, a differential amplifier 130 is qualified by the high signal from the counter 120. Therefore, as in the prior system, the differential amplifier 130 is operative only during the self-calibrating mode of operation, when the "test" or developed range signal (from the receiver and control circuits 102) is supplied through a conductor 132 to the differential amplifier 130.

The other input to the differential amplifier 130 is supplied through one of four "and" gates R1, R2, R3 or R4, which provide the reference test signal from one of the test signal sources C1, C2, C3 or C4. The outputs from the gates R1, R2, R3 and R4 are common to a conductor 134 which is connected to the input of the differential amplifier 130. The gates R1, R2, R3 and R4 are connected to the test signal sources C1, C2, C3 and C4 respectively which provide the precise reference signals indicative of the selected test altitudes. The gates R1, R2, R3 and R4 are also connected to receive the signals T1, T2, T3 and T4 respectively so that only one of the gates is qualified depending upon the indicated range.

Considering now an exemplary cycle of self-calibration operation, assume for example that the indicated range is 60 feet. When the counter 120 reaches capacity, e.g., a count of one thousand, it overflows and provides a high signal to the conductor 121 thereby qualifying the self-calibration gates as well as "and" gate 127 and inhibiting the gate 106 through inverter 136. Thus, the sets of "and" gates D, A and R are all partially qualified by the output from the counter 120. The particular gate in each set which is fully qualified depends upon the amplitude of the range signal in the conductor 122. Therefore, assuming an indicated range of sixty feet, the related range signal amplitude in the conductor 122 would be quantized to provide a high level for the signal T1 exclusively thereby establishing a fifty foot range for purposes of calibration. Consequently, the "and" gates D1, A1, and R1 are fully qualified.

The fully qualified "and" gate D1 allows a pulse from the trigger pulse circuit 104 to pass through the gate D1 to the one hundred nanosecond delay circuit S1. That delay is precisely the interval required for a pulse energy to travel fifty feet and return as an echo. Consequently, the first step is accomplished in synthesizing the echo signal, i.e., providing a predetermined delay.

The output from the delay circuit S1 is applied through the conductor 126 to the transmitter circuit 100 resulting in a burst of RF energy which is passed through the qualified "and" gate A1 to an attenuation pad P1 which attenuates the energy by an amount related to an arbitrary reference range of fifty feet.

The output from the attenuator pad P1 is thus a synthesized echo signal which is applied through the conductor 112, diode switch network 142, and conductor 113 to the receiver and control circuits 102. On receipt of such a synthesized echo signal, the circuits 102 provide an output (derived for a fifty foot range) to a conductor 132 which is applied to the differential amplifier 130.

The amplitude of the signal from the circuits 102 is developed from a synthesized echo representative of a fifty foot range. However, the exact amplitude of the range signal which should be developed to manifest the fifty foot range is provided as a reference signal from the test signal source C1 through the qualified gate R1 and the conductor 134 to the differential amplifier 130 for comparison with the developed range signal. The difference between those signals (developed range and reference range) is provided from the differential amplifier 130 and is representative of the error presently occurring in the system. That error signal may be employed to adjust or calibrate the operation of the system.

Specifically, the error signal from the differential amplifier 130 is supplied to a memory 115 (of significantly longer duration than the memory 114) which supplies an adjusting, continuous error signal to the memory 114.

Consequently, the manifest error of operation at a range of fifty feet is employed as a corrective factor any time the system is operating at relatively low altitudes, e.g., sixty feet as assumed.

In the event that the detected range is greater, then a different set of "and" gates are qualified and the self-calibration operation is carried out to synthesize an echo signal more appropriately related to the current operating range. In this manner, the system effectively relates the periodic calibrating operations to the current operating range. For example, as stated above indicated ranges of below one hundred feet will result in calibrations at a reference range of fifty feet; indicated ranges from one to three hundred feet produce a calibration at a reference of one hundred and fifty feet; ranges between three hundred and seven hundred and fifty feet result in a calibration at five hundred feet; and ranges above seven hundred and fifty feet command a calibration at one thousand feet.

As indicated in FIG. 2, the output from the differential amplifier 130 is supplied through the memory 115 to vary the contents of the memory 114 in a proportionate adjustment. However, the error signal from the differential amplifier 130 also may be employed to adjust the time-distance relationship in the receiver and control circuits 102 as by adjusting ramp slopes, or other signals or circuits as will be readily apparent to those skilled in the art. Such an arrangement requires a conductor 151 (shown in phantom) to deliver the error signal from the amplifier 130 to the circuits 102.

Systems hereof may be variously constructed to utilize different combinations of the features disclosed. Of course, in some situations, it will be desirable to afford manual control of the self-test cycle. Alternatively, in other situations it will be desirable to provide automatic control and corrective calibration. In the event that the latter arrangement is employed, overall accuracy can be improved or alternatively individual component circuits in the system can be compromised without loss of accuracy in comparison with systems that do not incorporate self-calibration.

What is claimed is:

1. An echo-pulse distance-measuring system wherein pulses of travelling wave energy are transmitted and echoes therefrom are sensed, comprising:
   program synchronizing means;
   transmitter means operatively controlled by said program synchronizing means to transmit said pulses;
   receiver means controlled by said program synchronizing means to sense said echoes to provide an indication of distance;
   means for delaying the operation of said transmitter means to transmit one of said pulses;
   attenuation means;
   self-test control means actuatable to couple said attenuation means between said transmitter means and said receiver means, and furthermore to actuate said means for delaying;
   comparator means coupled to said receiver means to receive derived signals developed from said attenuation means through said receiver means; and
   means for supplying a reference signal to said comparator means, for comparison with said derived signals during intervals of self-test, whereby said comparator means provides error signals indicative of derivations between said derived signals and said reference signal.

2. A system according to claim 1 wherein said transmitter means includes a cavity oscillator and means for controlling said cavity oscillator.

3. A system according to claim 1 further including a connection means for varying the operation of said receiver means in accordance with said error signal whereby to calibrate said system.

4. A system according to claim 1 including a plurality of said means for delaying and a like plurality of attenuation means and further including means for selectively actuating one of said attenuation means in accordance with the distance indication of said receiver.

5. A system according to claim 4 further including a connection means for varying the operation of said receiver means in accordance with said error signal whereby to calibrate said system.

6. A system according to claim 1 further including a counter means for actuating said self-test means at predetermined intervals.

7. A system according to claim 1 further including means to delay and attenuate said referenced signal as a function of altitude to provide a means of qualitative checking the transmitter output power and receiver sensitivity for the particular test altitude.

8. An echo-pulse distance-measuring system wherein pulses of travelling wave energy are transmitted and echoes therefrom are sensed, comprising:
   program synchronizing means;
   transmitter means operatively controlled by said program synchronizing means to transmit said pulses;
   receiver means controlled by said program synchronizing means to sense said echoes to provide an indication of distance;
   self-test means coupled to said transmitter means for providing attenuated pulses, delayed by a predetermined interval;
   self-test control means for coupling said attenuated pulses to said receiver means;
   comparator means coupled to said receiver means to receive derived signals developed from said attenuated pulses through said receiver means;
   means for supplying a reference signal to said comparator means, for comparison with said derived signals during intervals of self-test, whereby said comparator means provides error signals indicative of derivations between said derived signals and said reference signal; and
   correction means for varying the operation of said receiver means in accordance with said error signal whereby to calibrate said system.

9. A system according to claim 8 including a plurality of said self-test means for attenuating and delaying said pulses by a plurality of predetermined intervals; and wherein said self-test control means includes means for selectively actuating a selected self-test means in accordance with the distance indicated by said receiver means.

10. A system according to claim 9 further including a counter means for actuating said self-test means at predetermined intervals.

11. A system according to claim 8 wherein said correction means includes means for varying the time-distance relationship within said receiver.

References Cited

UNITED STATES PATENTS

| 3,242,489 | 3/1966 | Leyde. |
| 3,302,199 | 1/1967 | Kelly et al. |
| 3,341,849 | 9/1967 | Cordry et al. _____ 343—17.7X |

RODNEY D. BENNETT, Primary Examiner

T. H. TUBBESING, Assistant Examiner